United States Patent
Yamashita

(10) Patent No.: US 11,210,528 B2
(45) Date of Patent: Dec. 28, 2021

(54) INFORMATION PROCESSING APPARATUS, INFORMATION PROCESSING METHOD, SYSTEM, AND STORAGE MEDIUM TO DETERMINE STAYING TIME OF A PERSON IN PREDETERMINED REGION

(71) Applicant: CANON KABUSHIKI KAISHA, Tokyo (JP)

(72) Inventor: Yutaka Yamashita, Shiroi (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/592,686

(22) Filed: Oct. 3, 2019

(65) Prior Publication Data

US 2020/0125855 A1    Apr. 23, 2020

(30) Foreign Application Priority Data

Oct. 18, 2018 (JP) .............................. JP2018-197020

(51) Int. Cl.
*G06K 9/00* (2006.01)
*G07C 1/12* (2006.01)
*G07C 9/37* (2020.01)

(52) U.S. Cl.
CPC ..... *G06K 9/00771* (2013.01); *G06K 9/00288* (2013.01); *G07C 1/12* (2013.01); *G07C 9/37* (2020.01)

(58) Field of Classification Search
CPC ........... G06K 9/00771; G06K 9/00288; G06K 9/00255; G06K 9/00295; G07C 9/37; G07C 1/12; G07C 9/38; G07C 9/00896; G07C 9/32; G07C 9/10; G07C 2011/02
See application file for complete search history.

(56) References Cited

U.S. PATENT DOCUMENTS

2018/0068173 A1*  3/2018  Kolleri ................. G06F 16/29
2019/0311104 A1* 10/2019  Maeno .................. G06F 16/51

FOREIGN PATENT DOCUMENTS

| JP | 07-249138 A | 9/1995 |
| JP | 2016-165157 A | 9/2016 |
| JP | 2018-120644 A | 8/2018 |

OTHER PUBLICATIONS

Machine translation for JP H07-249138 (Year: 1995).*

* cited by examiner

*Primary Examiner* — Qian Yang
(74) *Attorney, Agent, or Firm* — Canon U.S.A., Inc. IP Division

(57) ABSTRACT

An information processing apparatus associates a registration image with first clock time at which a person of the registration image has passed through a gate in a first direction with use of tracking, performs matching, based an image containing a person who is tracked starting with a state of being situated inside a predetermined region and the registration image, to determine whether the person and a person of the registration image are an identical person, determines whether a person who is tracked has passed through the gate in a second direction, associates a person determined as an identical person by matching with second clock time at which the person has passed through the gate in the second direction with use of tracking, and derives a time during which the person has stayed in the predetermined region, based on the first clock time and the second clock time.

9 Claims, 11 Drawing Sheets

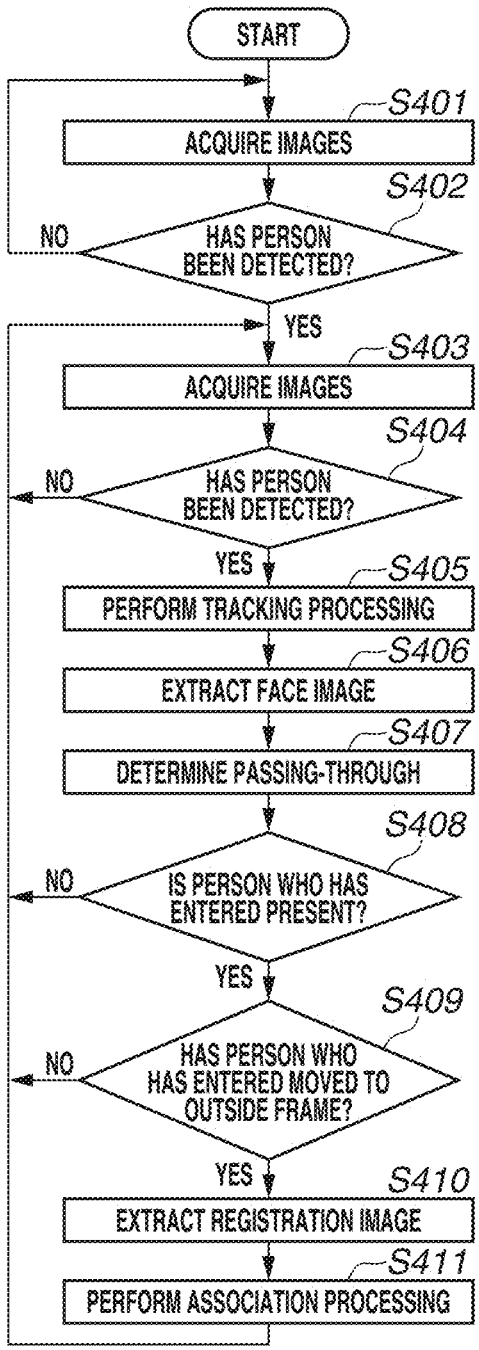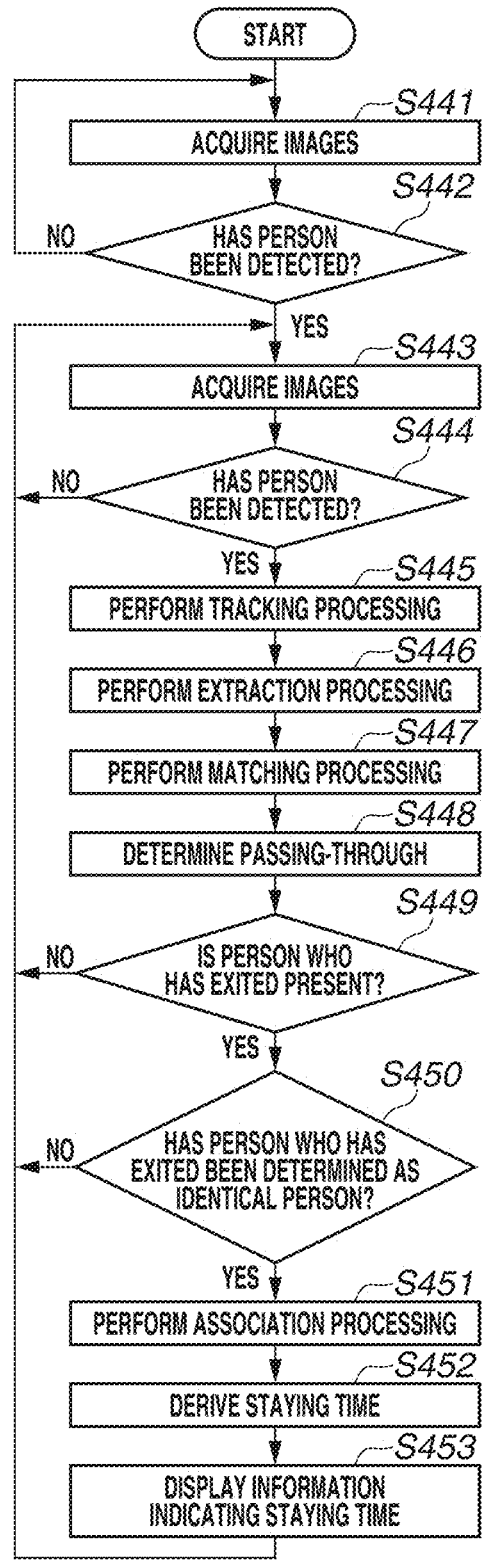

FIG.5A

PERSON ID: 1a — 500

| IMAGING APPARATUS ID | IMAGE ID | GATE ID | CLOCK TIME | POSITION (x, y) | FACE IMAGE INFORMATION | REGISTRATION IMAGE | ENTRY FLAG |
|---|---|---|---|---|---|---|---|
| Camera111 | 1a | Gate210 | 13:00:00 | aa, ab | (a1, a2, a3, ...) | 1 | 0 |
| Camera111 | 2a | Gate210 | 13:00:01 | ac, ad | (b1, b2, b3, ...) | 0 | 0 |
| Camera111 | 3a | Gate210 | 13:00:02 | ae, af | (c1, c2, c3, ...) | 0 | 1 |
| Camera111 | 4a | Gate210 | 13:00:03 | ag, ah | (d1, d2, d3, ...) | 0 | 1 |

| PERSON ID | IMAGE ID | REGISTRATION FACE IMAGE | ENTRY TIME |
|---|---|---|---|
| 1a | 1a | (a1, a2, a3, ...) | 13:00:02 |
| 2a | 8a | (d1, c2, a3, ...) | 13:00:09 |
| 3a | 10a | (s1, b2, s3, ...) | 13:04:03 |
| 4a | 21a | (a1, d2, a3, ...) | 13:05:05 |

PERSON ID: 6d

600

| IMAGING APPARATUS ID | IMAGE ID | GATE ID | CLOCK TIME | POSITION (x, y) | FACE IMAGE INFORMATION | MATCHING | EXIT FLAG |
|---|---|---|---|---|---|---|---|
| Camera114 | 1d | Gate211 | 14:00:01 | ca, cb | (e1, e2, e3, ...) | 1a | 0 |
| Camera114 | 2d | Gate211 | 14:00:02 | cc, cd | (f1, f2, f3, ...) | 0 | 0 |
| Camera114 | 3d | Gate211 | 14:00:03 | ce, cf | (g1, g2, g3, ...) | 0 | 1 |
| Camera114 | 4d | Gate211 | 14:00:04 | cg, ch | (h1, h2, h3, ...) | 0 | 1 |

| PERSON ID | IMAGE ID | MATCHING PERSON ID | EXIT TIME |
|---|---|---|---|
| 6d | 1d | 1a | 14:00:02 |
| 7d | 5d | 5a | 14:00:11 |
| 8d | 9d | 3a | 14:03:05 |
| 9d | 14d | 4a | 14:05:05 |

INFORMATION PROCESSING APPARATUS, INFORMATION PROCESSING METHOD, SYSTEM, AND STORAGE MEDIUM TO DETERMINE STAYING TIME OF A PERSON IN PREDETERMINED REGION

BACKGROUND

Field

One disclosed aspect of the embodiments generally relates to information processing techniques.

Description of the Related Art

As one of conventional techniques, there is a technique to derive, about each of persons having entered a facility, such as a store or a theme park, a staying time which is a time during which the person stays the facility. Then, the staying time derived about each of persons having entered the facility may be utilized for, for example, marketing uses.

Japanese Patent Application Laid-Open No. 07-249138 discusses a technique of performing matching of individual persons based on two types of images respectively captured by cameras for entering persons and exiting persons and deriving a staying time based on a difference between clock times of acquisition of two matched images.

However, the technique discussed in Japanese Patent Application Laid-Open No. 07-249138 is not configured to detect clock time at a point of time when a person has passed through a predetermined position (gate). Therefore, the time at which an image containing a person situated at a position away from a gate for entering a predetermined region was captured may be determined as the entry time of the person, so that the accuracy of a staying time may decrease.

SUMMARY

According to an aspect of the embodiments, an information processing apparatus includes a detection unit, a tracking unit, a determination unit, an extraction unit, an association unit, a matching unit, and a derivation unit. The detection unit is configured to detect a person from an image containing a gate for entering or exiting a predetermined region. The tracking unit is configured to track a person who is detected by the detection unit. The determination unit is configured to determine whether a person who is tracked by the tracking unit has passed through the gate in a first direction, which is a direction from outside to inside the predetermined region. The extraction unit is configured to extract, from a plurality of images containing a person who is tracked by the tracking unit starting with a state of being situated outside the predetermined region, an image satisfying a predetermined condition as a registration image of the person. The association unit is configured to associate the registration image with first clock time at which a person corresponding to the registration image has passed through the gate in the first direction with use of tracking of the person performed by the tracking unit. The matching unit is configured to perform matching, based on at least one image of a plurality of captured images containing a person who is tracked by the tracking unit starting with a state of being situated inside the predetermined region and the registration image, to determine whether the person and a person corresponding to the registration image are an identical person. The derivation unit is configured to derive a staying time, which is a time during which a person determined as an identical person by the matching unit has stayed in the predetermined region. The determination unit further determines whether a person who is tracked by the tracking unit has passed through the gate in a second direction, which is a direction from inside to outside the predetermined region. The association unit associates a person determined as an identical person by the matching unit with second clock time at which the person has passed through the gate in the second direction with use of tracking performed by the tracking unit. The derivation unit derives a staying time, which is a time during which a person determined as an identical person by the matching unit has stayed in the predetermined region, based on the first clock time and the second clock time.

Further features of the disclosure will become apparent from the following description of exemplary embodiments with reference to the attached drawings.

BRIEF DESCRIPTION OF THE DRAWINGS

FIGS. 4A and 4B are flowcharts illustrating the flow of information processing for deriving a staying time.

FIGS. 5A and 5B are diagrams illustrating examples of tables each for use in information processing for deriving a staying time.

FIGS. 6A and 6B are diagrams illustrating examples of tables each for use in information processing for deriving a staying time.

DESCRIPTION OF THE EMBODIMENTS

Various exemplary embodiments, features, and aspects of the disclosure will be described in detail below with reference to the drawings. Furthermore, configurations described in the following exemplary embodiments are merely examples, and each exemplary embodiment should not be construed to be limited to such configurations.

Figure 1:
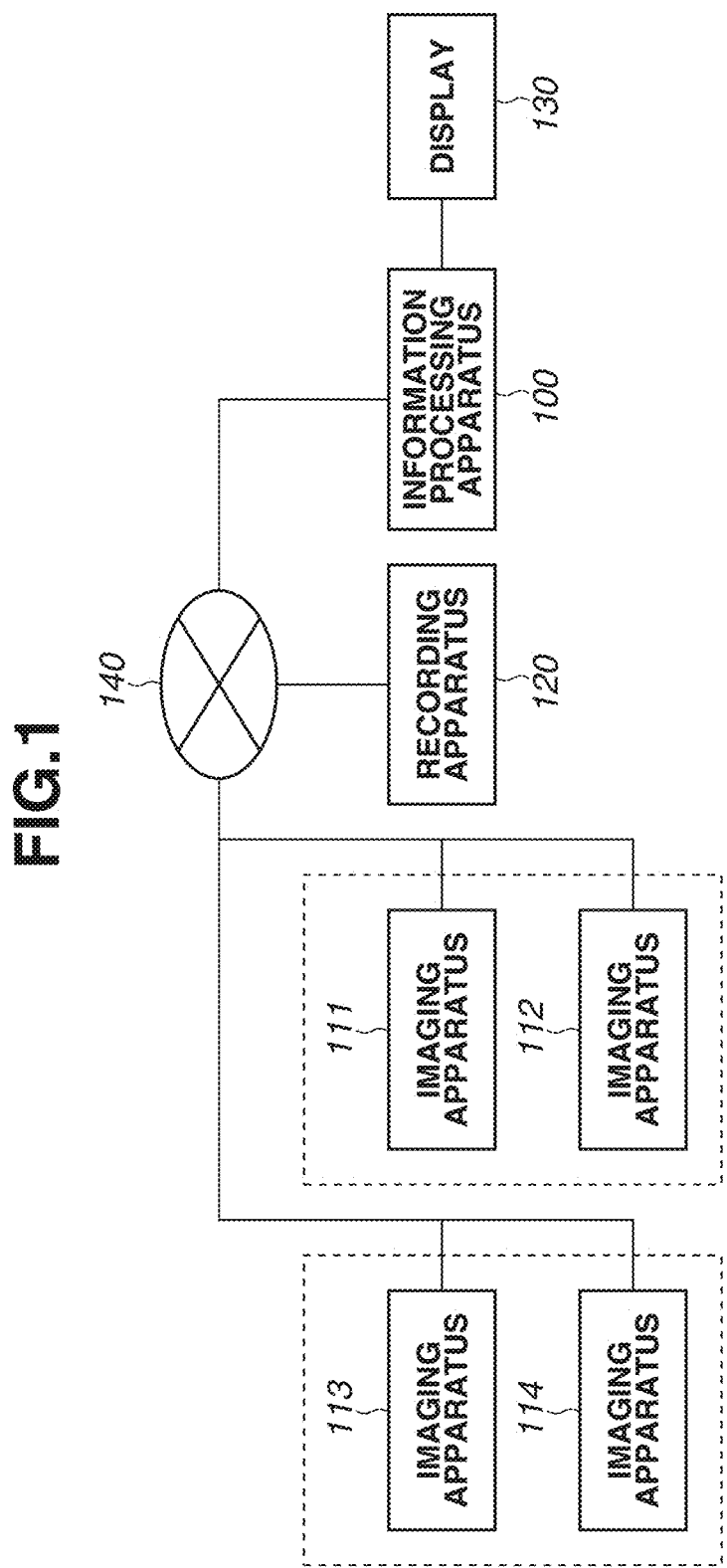
FIG. 1 is a diagram illustrating a system configuration.

FIG. 1 is a diagram illustrating a system configuration in a first exemplary embodiment. The system in the first exemplary embodiment includes an information processing apparatus 100, imaging apparatuses 111 to 114, a recording apparatus 120, and a display 130.

The information processing apparatus 100, the imaging apparatuses 111 to 114, and the recording apparatus 120 are interconnected via a network 140. The network 140 is implemented by, for example, a plurality of routers, switches, and cables compliant with a communication standard such as Ethernet.

Furthermore, the network 140 can be implemented by, for example, the Internet, a wired local area network (LAN), a wireless LAN, or a wide area network (WAN).

The information processing apparatus 100 is an apparatus which performs information processing for deriving a staying time, described below, with respect to images respectively captured by the imaging apparatuses 111 to 114. Furthermore, the information processing apparatus 100 is implemented by, for example, a personal computer on which a program for implementing functions of information processing described below is installed.

Each of the imaging apparatuses 111 to 114 is an apparatus which captures an image. For example, the imaging apparatus 111 associates image data which is based on captured image data, identification information (ID) for identifying the imaging apparatus 111, and information about clock time at which the image was captured with each other, and transmits the image data, the identification information, and the information associated with each other to the information processing apparatus 100 and the recording apparatus 120 via the network 140. Similarly, each of the imaging apparatuses 112 to 114 also associates image data obtained by image capturing, identification information about the imaging apparatus, and information about clock time at which the image was captured, and transmits the image data, the identification information, and the information associated with each other to the information processing apparatus 100 and the recording apparatus 120.

The recording apparatus 120 records image data about an image captured by each of the imaging apparatuses 111 to 114, identification information about the imaging apparatus, and information about clock time at which the image was captured while associating them with each other. Then, pursuant to a request from the information processing apparatus 100, the recording apparatus 120 transmits recorded data (for example, an image, ID, and clock time) to the information processing apparatus 100.

The display 130 is configured with, for example, a liquid crystal display (LCD). Moreover, the display 130 is connected to the information processing apparatus 100 via a display cable compliant with a communication standard such as High-definition Multimedia Interface (HDMI®).

Moreover, the display 130 functions as a display unit, and displays, for example, an image captured by each of the imaging apparatuses 111 to 114 and a setting screen related to information processing described below. Furthermore, at least any two of the display 130, the information processing apparatus 100, and the recording apparatus 120 can be provided in a single casing.

Figure 2:
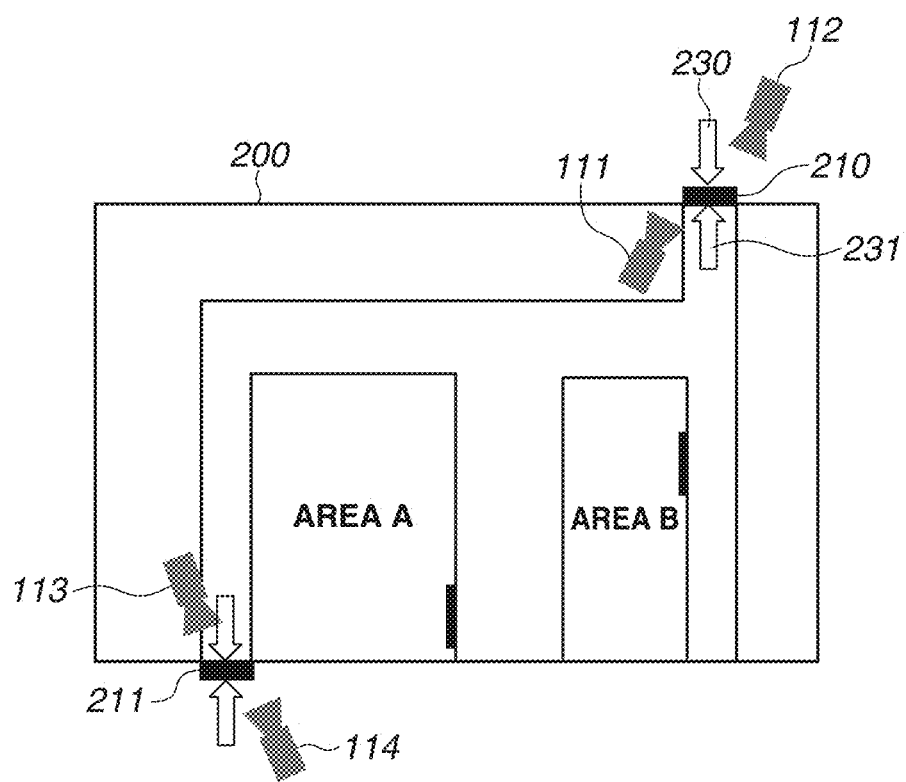
FIG. 2 is a diagram used to explain information processing for deriving a staying time.

Next, information processing in the first exemplary embodiment is described with reference to FIG. 2. FIG. 2 is a diagram used to explain information processing which is performed by the information processing apparatus 100 in the first exemplary embodiment.

Referring to FIG. 2, each of a gate 210 and a gate 211 is a pass-through point at which a person enters or exits a predetermined region 200, which is a facility such as a store or a theme park. Furthermore, while, in the first exemplary embodiment, two gates are provided in the predetermined region 200, only one gate can be provided or three or more gates can be provided. Furthermore, the predetermined region 200 can be indoor or can be outdoor. Moreover, an entering direction 230 indicates a direction going from outside to inside the predetermined region 200. On the other hand, an exiting direction 231 is a direction going from inside to outside the predetermined region 200.

Referring to FIG. 2, the imaging apparatus 111 is assumed to be installed in such a way as to perform image capturing of a person who passes through the gate 210 in the entering direction 230 (a first direction), and the imaging apparatus 112 is assumed to be installed in such a way as to perform image capturing of a person who passes through the gate 210 in the exiting direction 231 (a second direction). Moreover, the imaging apparatus 113 is assumed to be installed in such a way as to perform image capturing of a person who passes through the gate 211 in the entering direction 230, and the imaging apparatus 114 is assumed to be installed in such a way as to perform image capturing of a person who passes through the gate 211 in the exiting direction 231.

The information processing apparatus 100 in the first exemplary embodiment derives the amount of time from when a person entering the predetermined region 200 enters the predetermined region 200 to when the person exits the predetermined region 200, in other words, a staying time, which is a time during which the person has stayed in the predetermined region 200.

Figure 3:
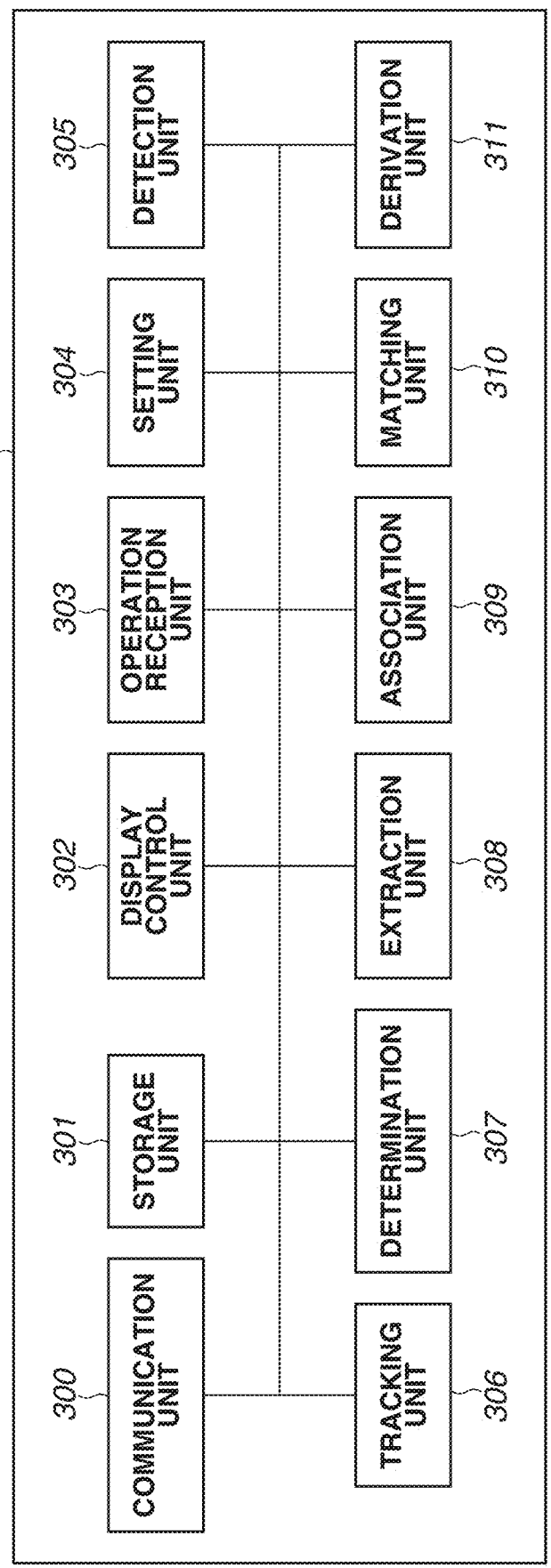
FIG. 3 is a diagram illustrating functional blocks of an information processing apparatus.

Next, information processing for deriving a staying time, which is performed by the information processing apparatus 100 in the first exemplary embodiment, is described with reference to functional blocks of the information processing apparatus 100 illustrated in FIG. 3. Furthermore, in the case of the first exemplary embodiment, the respective functions illustrated in FIG. 3 are implemented by a central processing unit (CPU) 1100 (FIG. 11) of the information processing apparatus 100 executing a computer program stored in a read-only memory (ROM) 1120 (FIG. 11) of the information processing apparatus 100.

Figure 11:
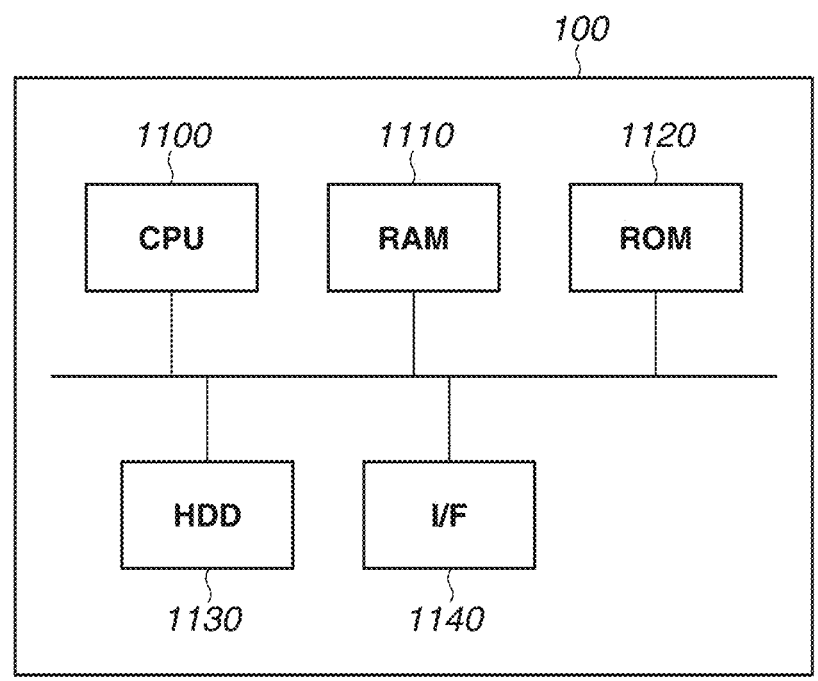
FIG. 11 is a diagram illustrating a hardware configuration of each apparatus.

A communication unit 300 is able to be implemented by an interface (I/F) 1140, which is described below with reference to FIG. 11, and performs communications with the imaging apparatuses 111 to 114 and the recording apparatus 120 via the network 140. For example, the communication unit 300 receives image data about an image captured by the imaging apparatus 111, or transmits, to the imaging apparatus 111, a control command for controlling the imaging apparatus 111. Furthermore, the control command includes, for example, commands for instructing the imaging apparatuses 111 to 114 to perform image capturing.

Figure 7A:
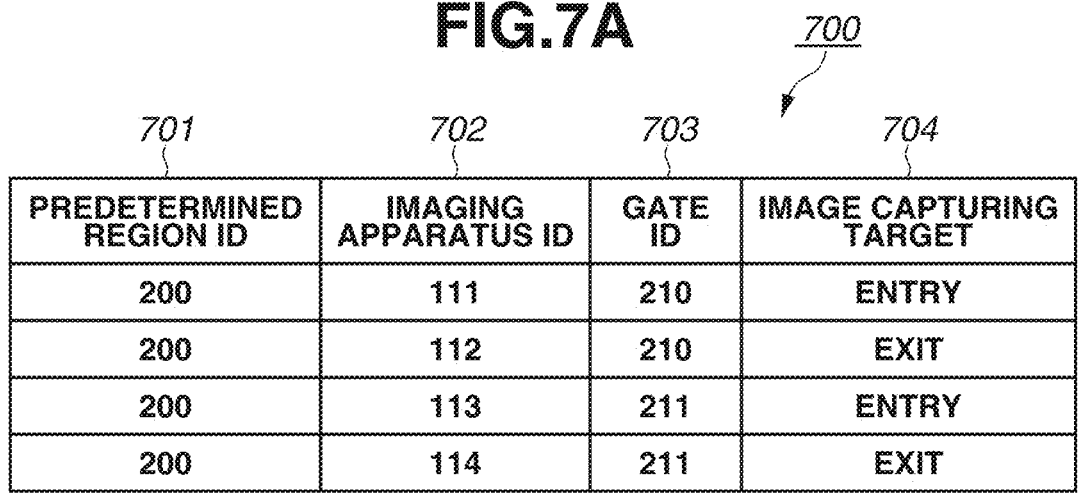
FIGS. 7A and 7B are diagrams illustrating examples of tables each for use in information processing for deriving a staying time.

A storage unit 301 is able to be implemented by, for example, a random access memory (RAM) 1110 or a hard disk drive (HDD) 1130, which is described below with reference to FIG. 11, and stores information and data related to information processing which is performed by the information processing apparatus 100. For example, the storage unit 301 stores installation information, which is information about installation conditions of the respective imaging apparatuses 111 to 114. A table 700 illustrated in FIG. 7A is an example of the installation information. The table 700 includes a predetermined region identifier (ID) 701, which is information for identifying each predetermined region, an imaging apparatus ID 702, which is information for identifying each imaging apparatus, a gate ID 703, which is information for identifying each gate corresponding to a particular predetermined region, and an image capturing target 704, which indicates information about an image capturing target of each imaging apparatus. Furthermore, the image capturing target 704 indicates on which of a person who passes through the gate in the entering direction 230 and a person who passes through the gate in the exiting direction 231 each imaging apparatus performs image capturing.

For example, the table 700 indicates that the imaging apparatus 111 is installed in such a way as to perform image capturing of a person who passes through the gate 210 of the predetermined region 200 illustrated in FIG. 2 in the entering direction 230.

A display control unit 302 causes the display 130 to display, for example, an image captured by each of the imaging apparatuses 111 to 114, a setting screen for performing setting related to information processing for deriving a staying time, and information indicating a result of the information processing.

An operation reception unit 303 receives information about an operation performed by the user via an input device (not illustrated), such as a keyboard or a mouse. For example, the operation reception unit 303 receives an operation which is performed by the user to designate a passing line used for a determination unit 307 to determine whether a person has passed through the gate.

A setting unit 304 performs setting related to information processing which is performed by the information processing apparatus 100. For example, the setting unit 304 performs setting of a passing line designated by the user's operation based on an operation performed by the user received by the operation reception unit 303.

A detection unit 305 performs detection processing for detecting a person contained in an image. The detection unit 305 in the first exemplary embodiment performs detection processing for detecting a person contained in an image by performing, for example, pattern matching with use of matching patterns (dictionary).

A tracking unit 306 tracks a person detected by the detection unit 305. The tracking unit 306 in the first exemplary embodiment performs, for example, the following processing while targeting frames of an image captured by the imaging apparatus 111. In a case where the same person as a person detected by the detection unit 305 from an image of the frame one or more frames earlier than the current frame is present in an image of the current frame, the tracking unit 306 correlates the two persons in the respective frames with each other. In other words, the tracking unit 306 tracks a person between images with respect to a plurality of temporally close frames. Furthermore, details of the tracking processing which is performed by the tracking unit 306 are described below.

The determination unit 307 determines whether a person who is tracked by the tracking unit 306 has passed a detection line in an image and determines in which direction the person has passed the detection line.

Furthermore, in the first exemplary embodiment, as shown in the table 700, which indicates installation information about imaging apparatuses, the imaging apparatuses 111 and 113 capture images of persons passing through the gates 210 and 211, respectively, in the entering direction 230. Then, the imaging apparatuses 112 and 114 capture images of persons passing through the gates 210 and 211, respectively, in the exiting direction 231.

Thus, the determination unit 307 in the first exemplary embodiment determines whether persons have passed through the gates 210 and 211, respectively, in the entering direction 230, based on the respective images captured by the imaging apparatuses 111 and 113. Moreover, the determination unit 307 determines whether persons have passed through the gates 210 and 211, respectively, in the exiting direction 231, based on the respective images captured by the imaging apparatuses 112 and 114.

An extraction unit 308 extracts, from a plurality of images containing a person which is tracked by the tracking unit 306 starting with a state of being situated outside a predetermined region, an image satisfying a predetermined condition as a registration image of the person.

Furthermore, in the first exemplary embodiment, the extraction unit 308 extracts, from a plurality of images containing a person which is tracked by the tracking unit 306 starting with a state of being situated outside the predetermined region 200, an image containing a face (face image) of the person. Then, the extraction unit 308 extracts, from the extracted face images of the person, an image satisfying a predetermined condition as a registration image of the person. Furthermore, the image satisfying a predetermined condition is an image adapted for matching processing which is performed by a matching unit 310 described below. Furthermore, details of processing which is performed by the extraction unit 308 are described below.

An association unit 309 associates the registration image extracted by the extraction unit 308 with entry time at which the person of the registration image has passed through the gate 210 or 211 in the entering direction 230 with use of tracking of the person performed by the tracking unit 306. Furthermore, details of processing which is performed by the association unit 309 are described below.

The matching unit 310 performs matching, based on at least one image of a plurality of captured images containing a person who is tracked by the tracking unit 306 starting with a state of being situated inside the predetermined region and the registration image stored by the storage unit 301, to determine whether the person and a person of the registration image are the same person.

Then, the association unit 309 associates a person determined as the same person as the person of the registration image by the matching unit 310 with exit time at which the person has passed through the gate 210 or 211 in the exiting direction 231 with use of tracking performed by the tracking unit 306.

While targeting a person who has passed through the gate 210 or 211 in the exiting direction 231 and has been determined as the same person as the person of the registration image by the matching unit 310, a derivation unit 311 derives a staying time, which is a time during which the person has stayed in the predetermined region 200, based on the entry time and the exit time associated with the person.

Next, information processing which is performed by the information processing apparatus 100 in the first exemplary embodiment is described in further detail with reference to FIGS. 4A and 4B to FIG. 8. FIGS. 4A and 4B are flowcharts illustrating the flows of information processing which is performed by the information processing apparatus 100 in the first exemplary embodiment.

Executing the flowchart illustrated in FIG. 4A enables associating entry time of a person passing through the gate 210 or 211 in the entering direction 230 with a registration image of the person adapted for matching processing. Moreover, executing the flowchart illustrated in FIG. 4B enables the information processing apparatus 100 to derive a time during which a person having entered the predetermined region 200 stays in the predetermined region 200.

Furthermore, processing in the flowcharts illustrated in FIGS. 4A and 4B is assumed to be started or ended in response to an operation performed by the user.

Furthermore, processing in the flowcharts illustrated in FIGS. 4A and 4B is assumed to be performed by the functional blocks illustrated in FIG. 3, which are implemented by the CPU 1100 (FIG. 11) of the information processing apparatus 100 executing a computer program stored in the ROM 1120 (FIG. 11) of the information processing apparatus 100.

First, the flowchart of FIG. 4A is described. Furthermore, in the first exemplary embodiment, the flowchart illustrated in FIG. 4A corresponds to processing which is performed on an image containing a person passing through the gate 210 or 211, which is a gate of the predetermined region 200, in the entering direction 230. Accordingly, in the case of the example illustrated in FIG. 2, the processing illustrated in FIG. 4A is processing which is performed on images captured by the imaging apparatuses 111 and 113, which are imaging apparatuses in which the image capturing target 704 in the table 700 indicates "entry".

In step S401 illustrated in FIG. 4A, the communication unit 300 acquires images captured by the imaging apparatuses 111 and 113.

Next, in step S402, the detection unit 305 performs detection processing for detecting a person with respect to the images acquired in step S401. At this time, if a person has been detected from the images (YES in step S402), the processing proceeds to step S403. On the other hand, if no person has been detected from the images (NO in step S402), the processing returns to step S401, and then in step S401, the communication unit 300 acquires next images.

Furthermore, in the case of detecting a person from images, using both matching patterns used for a case where the person stands frontally and a case where the person stands sideways enables expecting an increase in detection accuracy. For example, matching patterns used for performing matching with respect to persons standing frontally (or in a back view) and matching patterns used for performing matching with respect to persons standing sideways are able to be retained, and both of the matching patterns are able to be used based on the installation states of imaging apparatuses or the designation made by the user.

Moreover, matching patterns used for performing matching with respect to persons viewed from other directions, such as oblique directions or upper directions, can be additionally prepared. Moreover, in the case of detecting a person, matching patterns (dictionary) indicating characteristics of whole bodies do not necessarily need to be prepared, and matching patterns can also be prepared with respect to parts of bodies, such as upper bodies, lower bodies, heads, faces, and foots.

Furthermore, the detection unit 305 only needs to have the function of detecting a person from images, and can also use, for example, known dynamic body detection or skin color detection, so that the detection method is not limited to only the pattern matching processing.

In step S403, the communication unit 300 acquires images which have been captured by the imaging apparatuses 111 and 113 temporally later than the images acquired in step S401. For example, in step S403, the communication unit 300 acquires images of a frame next to the frame of the images acquired in step S401.

Next, in step S404, the detection unit 305 performs detection processing for detecting a person with respect to the images acquired in step S403. At this time, if a person has been detected from the images (YES in step S404), the processing proceeds to step S405. On the other hand, if no person has been detected from the images (NO in step S404), the processing returns to step S403, and then in step S403, the communication unit 300 acquires images of a next frame.

Next, in step S405, the tracking unit 306 tracks the person detected by the detection unit 305. Furthermore, the tracking unit 306 assigns an ID to each person targeted for tracking. For example, the tracking unit 306 is assumed to assign an ID "1a" to a person which the detection unit 305 has detected from an image of the frame one or more frames earlier than the current frame. In that case, when the detection unit 305 has also detected the person from an image of the current frame, the tracking unit 306 also assigns an ID "1a" to the person.

In this way, in a case where the same persons have been detected from images of a plurality of continuous frames, the tracking unit 306 assigns the same ID to each person. Furthermore, the storage unit 301 stores, in a table, trajectory information, which is information about a trajectory with which each person to which the person ID is assigned has moved.

A table 500 illustrated in FIG. 5A is a table indicating an example of a data structure including trajectory information which is generated by the storage unit 301 based on processing performed by the tracking unit 306 and is stored in the storage unit 301. The table 500 stores therein the following pieces of information based on processing performed by the tracking unit 306 with respect to a person to which "1a" is assigned by the tracking unit 306 as indicated in a person ID 501. The table 500 includes an imaging apparatus ID 502, which is information for identifying an imaging apparatus, an image ID 503, which is information for identifying an image, a gate ID 504, which is information for identifying a gate, clock time 505, which indicates the clock time of image capturing of an image, and a position 506, which indicates the position of a person in an image. Such a table 500 is present for every person ID, i.e., for every person who is tracked by the tracking unit 306, and the respective tables 500 are stored in the storage unit 301. Furthermore, the position of a person represents the coordinates of the center of mass of a region of the person in an image with the upper left corner point of the image set as an origin. Furthermore, while face image information 507 and a registration image 508 are pieces of information which are stored based on processing performed by the extraction unit 308, and an entry flag 509 is information which is stored based on processing performed by the determination unit 307, these pieces of information are described below.

Furthermore, the method in which the tracking unit 306 determines that the persons detected from images of a plurality of continuous frames are the same person includes the following method. For example, if a movement predictive position of a person predicted with use of a movement vector of the detected person and the position of the detected person are within a predetermined distance, the method determines that the detected persons are the same person. Moreover, the tracking unit 306 can associate persons having high correlations between images of a plurality of frames with each other with use of, for example, the color, shape, and size (the number of pixels) of a person. In this way, the tracking unit 306 only needs to be able to perform processing for determining that the detected persons are the same person in images of a plurality of continuous frames and tracking the person determined as the same person, so that the determination method is not limited to a particular method.

Next, in step S406, the extraction unit 308 extracts, from images containing a person who is tracked by the tracking unit 306 starting with a state of being situated outside the predetermined region 200, an image containing the face (face image) of the person.

In the case of an example illustrated in FIG. 2, the extraction unit 308 extracts, from images captured by the imaging apparatus 111 (or the imaging apparatus 113), the face image of a person who is tracked by the tracking unit 306 starting with a state of being situated outside the predetermined region 200. At this time, the extraction unit 308 further extracts, with respect to the extracted face image, a feature quantity, which is information indicating features of the face of the person. Furthermore, the feature quantity of a person includes information about, for example, color, edge, texture, hair color, the shape of an organ of the face, the presence or absence of sunglasses, and the presence or absence of a mustache. Moreover, at this time, the detection unit 305 compares the face image extracted by the extraction unit 308 with matching patterns (dictionary) for frontal faces of persons and thus determines a face likelihood, which is information indicating the degree of image capturing of the face of a person.

Furthermore, as the face of a person contained in a face image is closer to a frontal face, the face likelihood becomes larger, as the face of the person is closer to a side face, the face likelihood becomes smaller, and, as the person faces backward, the face likelihood becomes further smaller. Furthermore, as the size of the detected face image is larger, the face likelihood of the face image can be made larger.

The storage unit 301 stores, in a table, registration information, which is information about face images extracted by the processing performed by the extraction unit 308. In the first exemplary embodiment, registration information which has been generated by the storage unit 301 based on the processing performed by the extraction unit 308 is stored in the table 500. As shown in the table 500, the following pieces of information are stored with respect to a person to which the person ID "1a" has been assigned by the tracking unit 306. In addition to trajectory information (the imaging apparatus ID 502, the image ID 503, the gate ID 504, the clock time 505, and the position 506), face image information 507, which is information about the face image extracted by the extraction unit 308, is stored in the table 500.

In the case of the table 500, the face image information 507 includes the position of a face image of a person in the captured image, the size of the face image, a feature quantity extracted from the face image by the extraction unit 308, and a face likelihood determined from the face image by the detection unit 305.

Next, in step S407, the determination unit 307 determines whether a person who is tracked by the tracking unit 306 has passed through a gate of the predetermined region 200 in the entering direction 230. In the example illustrated in FIG. 2, the determination unit 307 determines whether a person has passed through the gate 210 or 211 in the entering direction 230, based on images captured by the imaging apparatuses 111 and 113.

Furthermore, the determination unit 307 in the first exemplary embodiment determines whether a trajectory indicated by trajectory information for each person stored by the storage unit 301 and the position of a detection line intersect with each other, thus determining whether the person has passed through the detection line. Moreover, at this time, the determination unit 307 determines which direction the direction of passing-through of the person is.

The storage unit 301 generates entry information based on information indicating passing-through determined by the determination unit 307, and stores the generated entry information in a table. In the first exemplary embodiment, the entry information generated by the storage unit 301 based on information indicating passing-through determined by the determination unit 307 is stored in the table 500. At this time, with respect to a person to which the person ID "1a" has been assigned by the tracking unit 306, as shown in the table 500, information about the entry flag 509, which indicates whether the person has entered, is stored in the table 500. In the first exemplary embodiment, with regard to the entry flag 509 in the table 500, "0" indicates that the person has not entered, and "1" indicates that the person has entered.

Furthermore, the determination unit 307 not only determines whether a person has passed through a gate in the entering direction 230 but also sets the image capturing time of an image captured at that time as entry time. In other words, when it is determined by the determination unit 307 that a person has passed through a gate in the entering direction 230, "1", which indicates that a person has entered, is stored in the table 500 by the storage unit 301, and the time at which the acquired image has been captured is recorded as entry time.

In the case of the table 500, in an image ID "3a", "1" indicates that the determination unit 307 has determined that a person has passed through the gate 210 in the entering direction 230 at time "13:00:02".

As shown in the table 500, with regard to a person determined to have passed through the gate 210 in the entering direction 230 by the determination unit 307, a flag of "1", which indicates that the person has entered (has already entered), is stored as the entry flag 509.

Next, if, in step S408, among persons which are tracked by the tracking unit 306, a person who has passed through the gate 210 or 211 and has entered the predetermined region 200 is present (YES in step S408), the processing proceeds to step S409, and, if no person who has entered is present (NO in step S408), the processing returns to step S403. When the processing has returned to step S403, in step S403, the communication unit 300 acquires images of a next frame.

Furthermore, in a case where a person for which "1" is set as the entry flag 509 in the table 500 stored by the storage unit 301 is present, the determination unit 307 determines that a person who has already entered is present. For example, in a case where the current time is "13:00:03", based on the table 500, the determination unit 307 determines that a person of the person ID "1a" has already entered the predetermined region 200, at the time when an image of the image ID "4a" has been captured.

Next, if, in step S409, the determination unit 307 determines that, among persons who have already entered, a person who has moved to outside the current frame is present (YES in step S409), the processing proceeds to step S410, and, if no person who has moved to outside the current frame is present (NO in step S409), the processing returns to step S403. When the processing has returned to step S403, in step S403, the communication unit 300 acquires images of a next frame.

For example, in step S409, the determination unit 307 determines whether tracking processing performed by the tracking unit 306 is continuing with respect to a person of the person ID "1a", which is a person determined to have already entered the predetermined region 200 in step S408. For example, in a case where a person of the person ID "1a" is not able to be found in the current frame by the tracking unit 306, the determination unit 307 determines that tracking processing has ended with respect to the person of the person ID "1a". Furthermore, in a case where the person of the person ID "1a" has been hidden in the shadows and tracking processing has ended, the determination unit 307 also determines that tracking processing has ended with respect to the person of the person ID "1a".

At this time, when determining that tracking processing has ended with respect to the person of the person ID "1a", the determination unit 307 assumes that the person of the person ID "1a" has moved to outside the current frame, and the processing then proceeds to step S410. On the other hand, in a case where the determination unit 307 determines that tracking processing is continuing with respect to the person of the person ID "1a", the processing returns to step S403. When the processing has returned to step S403, in step S403, the communication unit 300 acquires images of a next frame.

Furthermore, if the result of determination in step S408 or S409 is NO, processing in step S406 is re-performed. Therefore, since processing in step S406 is performed a plurality of times, as a result, the extraction unit 308 extracts, from a plurality of images captured by the imaging apparatus 111 (or the imaging apparatus 113), a plurality of face images with respect to a person who is tracked by the tracking unit 306 starting with a state of being situated outside the predetermined region 200.

Next, in step S410, the extraction unit 308 extracts, from a plurality of face images of a person extracted by the extraction unit 308 in step S406 from when tracking is started until the person moves to outside the current frame, an image satisfying a predetermined condition as a registration image of the person.

Furthermore, the image satisfying a predetermined condition in the first exemplary embodiment is assumed to be, from among images containing a person who is tracked by the tracking unit 306, a face image whose face likelihood, which indicates the degree of image capturing of the face of the person, is greater than or equal to a first threshold value and is the highest.

Figure 8:
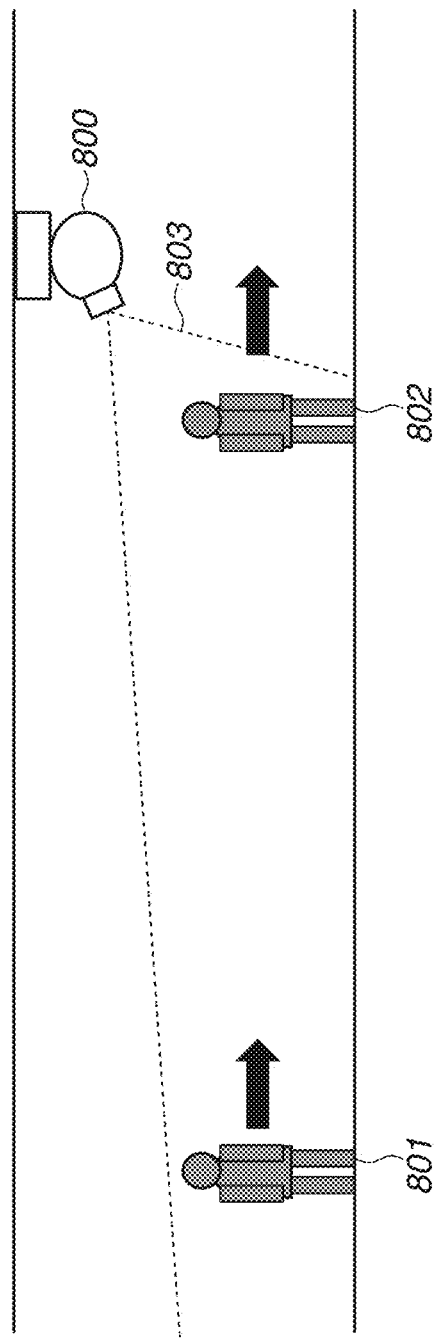
FIG. 8 is a diagram used to explain processing for extracting a face image adapted for matching processing.

Here, processing which is performed by the extraction unit 308 in step S410 is described with reference to FIG. 8. FIG. 8 is a diagram illustrating a situation in which an imaging apparatus 800 is performing image capturing of each of a person 801 and a person 802. Furthermore, arrows illustrated in FIG. 8 represent movement directions of the person 801 and the person 802, and a range 803 indicated by dashed lines represents a range with which the imaging apparatus 800 performs image capturing.

As illustrated in FIG. 8, the frontal face image of the person 801 is able to be captured with an image obtained by performing image capturing of the person 801. On the other hand, in the case of performing image capturing of the person 802, due to a positional relationship between the imaging apparatus 800 and the person 802, an image such as that obtained by seeing down the person 802 from above is captured. Thus, depending on, for example, the installation condition of the imaging apparatus 800 or the position of a person in the captured image, a frontal face image adapted for a registration image for use in matching processing, which performs matching to determine whether the detected persons are the same person, may be captured or an image unsuited for a registration image may be captured.

Therefore, in step S410, with respect to a particular person, the extraction unit 308 extracts, from a plurality of face images extracted by the extraction unit 308, a face image whose face likelihood is greater than or equal to a first threshold value and is the highest, as a registration image. Furthermore, the first threshold value can be a value set by the user or can be a previously registered value.

Furthermore, the storage unit 301 generates registration information, which is information that is based on processing which is performed by the extraction unit 308, and stores the generated registration information in a table. Specifically, as shown in the table 500, with respect to a person to which the person ID "1a" has been assigned by the tracking unit 306, a registration image 508, which is a flag indicating whether the corresponding face image is a registration image adapted for matching processing, is stored in the table 500 by the storage unit 301.

As shown in the table 500, in the registration image 508, "1" indicates that the corresponding face image is adapted for matching processing, and "0" indicates that the corresponding face image is not adapted for matching processing. Furthermore, in the first exemplary embodiment, from among the extracted face images, the extraction unit 308 assigns flag information "1" to a face image whose face likelihood is greater than or equal to the first threshold value and is the highest.

Next, in step S411, the association unit 309 associates the registration image extracted by the extraction unit 308 and the entry time at which a person of the registration image has passed through the gate 210 or 211 in the entering direction 230 with each other with use of tracking of the person performed by the tracking unit 306.

In the first exemplary embodiment, the association unit 309 generates association information obtained by associating the registration image with the entry time of the person of the registration image, based on the table 500 generated by the storage unit 301 based on processing performed by the tracking unit 306. The association information generated at this time is stored by the storage unit 301.

A table 550 illustrated in FIG. 5B is a data structure representing an example of association information which is generated by the association unit 309 based on processing performed by the association unit 309 in step S411. The table 550 includes a person ID 551, which is assigned to a person by the tracking unit 306 to identify the person, an image ID 552, which is associated with each registration image of the person, a registration face image 553, which is face image information about the registration image, and entry time 554 of the person.

As shown in the table 550, for example, with respect to a person of the person ID "1a", the association unit 309 associates the image ID "1a" corresponding to a face image extracted as a registration image, face image information about the face image, and entry time "13:00:02" of the person with each other.

As described above, it is possible to associate the entry time of a person passing through the gate 210 or 211 in the entering direction 230 and a registration image of the person adapted for matching processing with each other. In other words, it is possible to extract not only an image containing an image obtained at the time when the person passes through the gate in the entering direction 230 but also an image adapted for matching processing out of images captured during a process of being tracked, as a registration image of the person. Then, it is possible to associate the registration image and the entry time of a person of the registration image with each other with use of tracking.

Next, a flowchart illustrated in FIG. 4B is described. Furthermore, in the first exemplary embodiment, the flowchart illustrated in FIG. 4B corresponds to processing which is performed on an image containing a person passing through the gate 210 or 211, which is a gate of the predetermined region 200, in the exiting direction 231. Accordingly, in the case of the example illustrated in FIG. 2, the processing illustrated in FIG. 4B is processing which is performed on images captured by the imaging apparatuses 112 and 114, which are imaging apparatuses in which the image capturing target 704 in the table 700 indicates "exit".

First, in step S441, the communication unit 300 acquires images captured by the imaging apparatuses 112 and 114.

Next, in step S442, the detection unit 305 performs detection processing for detecting a person with respect to the images acquired in step S441. At this time, if a person has been detected from the images (YES in step S442), the processing proceeds to step S443. On the other hand, if no person has been detected from the images (NO in step S442), the processing returns to step S441, and then in step S441, the communication unit 300 acquires images of a next frame.

In step S443, the communication unit 300 acquires images which have been captured by the imaging apparatuses 112 and 114 temporally later than the images acquired in step S441. For example, in step S443, the communication unit 300 acquires images of a frame next to the frame of the images acquired in step S441.

Next, in step S444, the detection unit 305 performs detection processing for detecting a person with respect to the images acquired in step S443. At this time, if a person has been detected from the images (YES in step S444), the processing proceeds to step S445. On the other hand, if no person has been detected from the images (NO in step S444), the processing returns to step S443, and then in step S443, the communication unit 300 acquires images of a next frame.

Next, in step S445, the tracking unit 306 tracks the person detected by the detection unit 305. At this time, as with step S405, storage unit 301 generates trajectory information based on processing performed by the tracking unit 306. A table 600 illustrated in FIG. 6A is an example of a data structure including trajectory information generated by the storage unit 301 based on processing performed by the tracking unit 306 in step S445. The table 600 stores therein the following pieces of information based on processing performed by the tracking unit 306 with respect to a person to which a person ID "6d" is assigned by the tracking unit 306 as indicated in a person ID 601. The table 600 includes an imaging apparatus ID 602, which is information for identifying an imaging apparatus, an image ID 603, which is information for identifying an image, a gate ID 604, which is information for identifying a gate, clock time 605, which indicates the clock time of image capturing of an image, and a position 606, which indicates the position of a person in an image.

Furthermore, the table 600 is generated with respect to each of persons to which respective person IDs are assigned by the tracking unit 306. In the example of the table 600, the table 600 is generated with respect to the person ID "6d". Furthermore, details of face image information 607, matching 608, and an exit flag 609 in the table 600 are described below.

Next, in step S446, the extraction unit 308 extracts, from images containing a person who is tracked by the tracking unit 306 starting with a state of being situated inside the predetermined region 200, an image containing the face (face image) of the person. Furthermore, at this time, as with step S406, the extraction unit 308 extracts a feature quantity from the extracted face image. Moreover, at this time, as with step S406, the detection unit 305 can determine a face likelihood from the extracted face image.

The storage unit 301 generates extraction information based on processing performed by the extraction unit 308, and stores the generated extraction information in a table. At this time, for example, with respect to a person of the person ID "6d", as shown in the table 600, face image information 607 is stored in the table 600. As with the face image information 507, the face image information 607 includes the position of a face image of a person in the captured image, the size of the face image, a feature quantity extracted from the face image, and a face likelihood determined from the face image by the detection unit 305.

Next, in step S447, the matching unit 310 performs the following matching processing. The matching unit 310 performs matching to determine, based on an image obtained by performing image capturing of a person who is tracked by the tracking unit 306 starting with a state of being situated inside the predetermined region 200 and a registration image stored by the storage unit 301, whether the person and a person corresponding to the registration image are the same person.

In the first exemplary embodiment, the matching unit 310 compares a feature quantity of the face image extracted by the extraction unit 308 in step S446 with a feature quantity of the registration image, and calculates an authentication score, which indicates a degree of coincidence between a person corresponding to the face image and a person of the registration image. Furthermore, the higher authentication score indicates that the degree of coincidence is higher.

Then, if the authentication score calculated by comparing the feature quantity of the face image with the feature quantity of the registration image exceeds a second threshold value, the matching unit 310 determines that the person of the face image and the person of the registration image are the same person.

Furthermore, matching information, which is generated by the storage unit 301 based on the matching processing performed by the matching unit 310 is stored in a table. With regard to a person to which the person ID "6d" has been assigned by the tracking unit 306, as shown in the table 600, matching 608, which is information indicating a result of matching, is stored in the table 600. The example shown in the table 600 indicates that, with respect to a person (the person ID "6d") of the face image corresponding to the image ID "1d", a person of the person ID "1a" is the same person. Furthermore, in the first exemplary embodiment, "0" in the matching 608 indicates that the authentication score calculated by matching processing does not exceed the second threshold value and, thus, there is no person regarded as the same person.

Next, in step S448, the determination unit 307 determines whether a person tracked by the tracking unit 306 has passed through a gate of the predetermined region 200 in the exiting direction 231. In the example illustrated in FIG. 2, in step S448, the determination unit 307 determines, based on images captured by the imaging apparatuses 112 and 114, whether a person has passed through the gate 210 or 211 in the exiting direction 231.

The storage unit 301 generates exit information based on information indicating passing-through determined by the determination unit 307, and stores the generated exit information in a table. For example, with respect to a person to which the person ID "6d" has been assigned by the tracking unit 306, as shown in the table 600, information about an exit flag 609, which is a flag indicating whether the person has exited the predetermined region 200, is stored in the table 600. In the first exemplary embodiment, in the exit flag 609, "0" indicates that the person has not yet exited, and "1" indicates that the person has exited.

Furthermore, the determination unit 307 not only determines that a person has passed through a gate in the exiting direction 231 but also sets the image capturing time of an image captured at that time as exit time. In other words, when it is determined by the determination unit 307 that a person has passed through a gate in the exiting direction 231, "1", which indicates that a person has exited, is stored in the exit flag 609 by the storage unit 301, and the time at which the acquired image has been captured is recorded as exit time.

In the case of the table 600, in an image ID "3d", the determination unit 307 determines that the person has passed through the gate 211 in the exiting direction 231 at time "14:00:02", and "1" indicating that the person has exited is stored in the exit flag 609. At this time, time "14:00:02" is stored as exit time in the storage unit 301.

Next, if, in step S449, among persons which are tracked by the tracking unit 306, a person who has exited the predetermined region 200 through the gate 210 or 211 is present (YES in step S449), the processing proceeds to step S450. On the other hand, if no person who has exited is present (NO in step S449), the processing returns to step S443, and then in step S443, the communication unit 300 acquires images of a next frame. Furthermore, at this time, the determination unit 307 determines whether there is a person who has exited, based on information about the exit flag 609 stored by the storage unit 301.

For example, in a case where the current time is "14:00:03", the determination unit 307 determines that the person of the person ID "6d" has already exited the predetermined region 200, based on the exit flag 609 of the table 600.

Next, if, in step S450, among persons which have exited, a person determined to be identical with the person of the registration image by the matching unit 310 performing matching is present (YES in step S450), the processing proceeds to step S451. On the other hand, if no such person is present (NO in step S450), the processing returns to step S443, and then in step S443, the communication unit 300 acquires images of a next frame.

For example, in step S450, the determination unit 307 determines whether the person of the person ID "6d", who is a person determined to have exited the predetermined region 200 in step S449, has been determined to be identical with the person of the registration image by the matching unit 310 performing matching. Supposing that the current time is "14:00:03", the determination unit 307 determines, based on the table 600, that the person of the person ID "6d" has been determined by matching to be identical with the person "1a" of the registration image in the image ID "1d". In this case, the processing proceeds to step S451.

On the other hand, if the person of the person ID "6d" has not been determined by matching to be identical with the person of the registration image, the processing returns to step S443, and then in step S443, the communication unit 300 acquires images of a next frame.

Next, in step S451, the association unit 309 associates a person determined to be identical with the person of the registration image by the matching unit 310 performing matching with the exit time at which the person has passed through a gate in the exiting direction 231, with use of tracking performed by the tracking unit 306.

In the first exemplary embodiment, the association unit 309 performs the following processing based on the table 600 generated by the storage unit 301 based on tracking processing performed by the tracking unit 306. The association unit 309 generates association information in which a person determined to be identical with the person of the registration image by the matching unit 310 performing matching is associated with the exit time of the person.

For example, the association unit 309 identifies, based on the table 600, a person of the person ID "6d" determined to be identical with the person of the person ID "1a" by matching processing and the exit time "14:00:02" associated with the image ID "3d", and then associates the identified person and the identified exit time with each other. The association unit 309 performs such association processing to generate association information.

A table 660 illustrated in FIG. 6B is a data structure representing an example of association information which is generated by the association unit 309 based on processing performed by the association unit 309 in step S451. The table 660 includes a person ID 661, which is assigned by the tracking unit 306 to identify a person, a person ID 663 of a person determined to be the same person as the person of the person ID 661 by matching, an image ID 662, which identifies an image obtained when the persons are determined to be the same person by matching, and the exit time 664 of the person of the person ID 661.

Next, in step S452, the derivation unit 311 performs the following processing with respect to a target person who has passed through the gate 210 or 211 in the exiting direction 231 and has been determined to be the same person as the person of the registration image by the matching unit 310 performing matching. The derivation unit 311 derives a staying time, during which the target person has stayed in the predetermined region 200, from entry time and exit time associated with the target person based on the association information generated by the association unit 309.

In the first exemplary embodiment, the derivation unit 311 derives a staying time for every person in the predetermined region 200 based on the tables 550 and 660, which are pieces of association information generated by the association unit 309 in steps S411 and S451.

For example, the derivation unit 311 identifies the entry time associated with the person ID "1a" and the exit time associated with the person ID "6d", which indicates the same person as the person of the person ID "1a", based on the tables 550 and 660. Then, the derivation unit 311 derives a staying time of the person of the person ID "1a" in the predetermined region 200 based on a difference between the exit time and the entry time of the person of the person ID "1a".

In the cases shown in the tables 550 and 660, the derivation unit 311 derives that the staying time of the person of the person ID "1a" (=person ID "6d") in the predetermined region 200 is one hour.

Next, in step S453, the display control unit 302 causes the display 130 to display information indicating the staying time derived by the derivation unit 311.

Furthermore, the display control unit 302 in the first exemplary embodiment can cause the display 130 to display information obtained based on a result of information processing performed in the first exemplary embodiment in a superimposed manner on images captured by the imaging apparatuses 111 to 114.

Figure 9A:
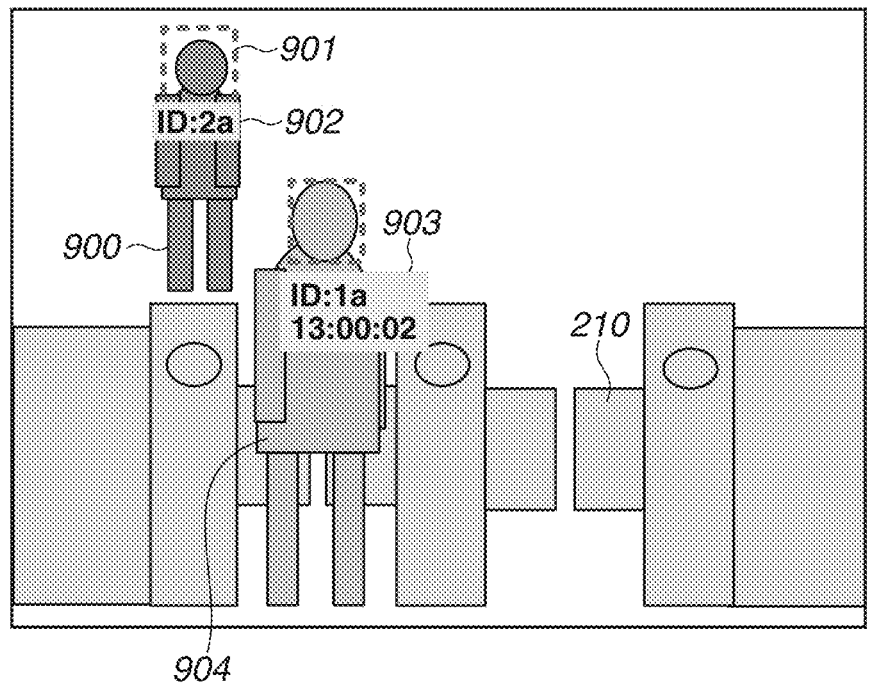
FIGS. 9A and 9B are diagrams used to explain display processing for displaying a result of information processing.
Figure 9B:
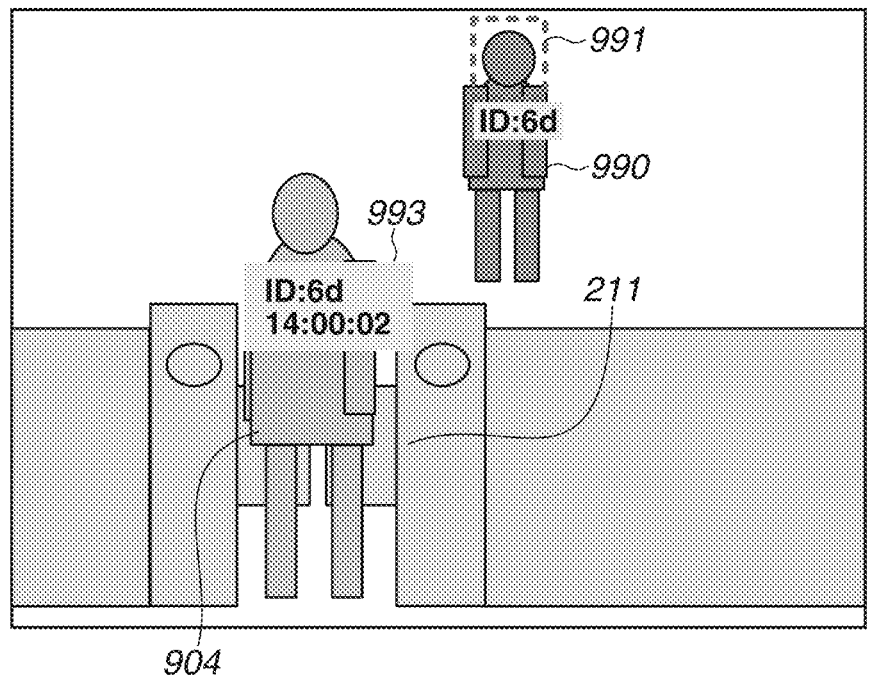

FIGS. 9A and 9B are diagrams illustrating examples of images each of which is displayed on the display 130 based on processing performed by the display control unit 302 in the first exemplary embodiment.

FIG. 9A is a diagram illustrating an example of an image captured by the imaging apparatus 111, which is installed in such a way as to perform image capturing of a person who passes through the gate 210 in the entering direction 230. Referring to FIG. 9A, a frame 901 is a frame indicating the position of a face which the extraction unit 308 has extracted with respect to a person 900. Moreover, a label 902 indicates a person ID which the tracking unit 306 has assigned to the person 900. Moreover, a label 903 indicates a person ID which the tracking unit 306 has assigned to a person 904. Moreover, the label 903 also indicates information about the entry time at which the person 904 has passed through the gate 210 in the entering direction 230.

FIG. 9B is a diagram illustrating an example of an image captured by the imaging apparatus 114, which is installed in such a way as to perform image capturing of a person who passes through the gate 211 in the exiting direction 231. Referring to FIG. 9B, a frame 991 is a frame indicating the position of a face which the extraction unit 308 has extracted with respect to a person 990. Moreover, a label indicating the person ID "6d" assigned to the person 990 is superimposed on the person 990. Moreover, a label 993 indicates a person ID which the tracking unit 306 has assigned to the person 904. Moreover, the label 993 also indicates information about the exit time at which the person 904 has passed through the gate 211 in the exiting direction 231.

Furthermore, with respect to a person who has passed through the gate 211 in the exiting direction 231 and the staying time of whom has been derived by the derivation unit 311, the display control unit 302 can display a label containing the person ID and the staying time of the person in a superimposed manner on the person.

Moreover, in the first exemplary embodiment, the matching unit 310 compares a feature quantity of the face image extracted by the extraction unit 308 in step S446 with a feature quantity of the registration image to derive an authentication score, and compares the authentication score with the second threshold value. Then, if the authentication score exceeds the second threshold value, the matching unit 310 determines that the person of the face image and the person of the registration image are the same person. In this way, in the first exemplary embodiment, while the threshold value to be compared with the authentication score by the matching unit 310 is made fixed, the first exemplary embodiment is not limited to this. For example, the threshold value can be made varied according to the position of a person of the face image extracted by the extraction unit 308.

Specifically, in step S446, the extraction unit 308 can change the threshold value based on information about the exit flag 609 generated based on processing performed by the determination unit 307. In this case, when performing matching processing with respect to a person to which the exit flag "1", which indicates that the person has already exited, has been assigned as shown in the table 600, the extraction unit 308 can change the threshold value, which is to be compared with the authentication score, to a third threshold value smaller than the second threshold value. This enables reducing any unintended omission of matching processing using the registration image with respect to a person who has already exited the predetermined region 200.

Moreover, while, in the first exemplary embodiment, each time a face image is extracted by the extraction unit 308 in step S446, the matching unit 310 performs matching processing between the face image and the registration image, the first exemplary embodiment is not limited to this. In a case where the result of determination in step S449 or S450 has become NO and the processing in step S446 has been repeated by the extraction unit 308, the extraction unit 308 extracts, from a plurality of extracted face images, a face image whose face likelihood is greater than or equal to the first threshold value. Then, the matching unit 310 can perform matching processing between the face image whose face likelihood is greater than or equal to the first threshold value and the registration image. Furthermore, the extraction unit 308 can extract, from a plurality of extracted face images, a face image whose face likelihood is greater than or equal to the first threshold value and is the highest, and the matching unit 310 can perform matching processing between the extracted face image and the registration image.

Moreover, in the first exemplary embodiment, in step S446, the extraction unit 308 extracts a face image, and the matching unit 310 performs matching processing using the registration image extracted by performing the flow illustrated in FIG. 4A with respect to the extracted face image. At this time, suppose a case where, after a first person is determined to be the same person as the person of a registration image by matching processing, a second person has been determined to be the same person as the person of the registration image by matching processing. At this time, when the authentication scores of the registration image with respect to the first person and the second person are compared with each other, if the authentication score of the registration image with respect to the second person is higher, the derivation unit 311 derives a staying time with use of the registration image with respect to the second person.

Specifically, as shown in the table 600, which is an example of matching information illustrated in FIG. 6A, the person of the person ID "1a" is determined to be the same person as the person of the person ID "6d" by matching processing performed by the matching unit 310. At this time, the authentication score is assumed to be "70" as an example.

In this case, suppose that, after matching processing performed with respect to the person of the person ID "6d", the person of the person ID "1a" is determined to be the same person as, for example, a person of the person ID "15d", who has been detected later than the person of the person ID "6d", by matching processing performed by the matching unit 310. At this time, the authentication score is assumed to be "80".

At this time, the determination unit 307 compares the authentication score "70" obtained with respect to the person ID "6d" with the authentication score "80" obtained with respect to the person ID "15d", and thus determines that the authentication score of the person of the person ID "15d" is higher.

With this, in a table 600 generated with respect to the person ID "15d", the storage unit 301 stores, in the matching 608, information indicating that the person of the person ID "15d" is the same person as the person of the person ID "1a". Then, the derivation unit 311 derives a staying time of the person from the exit time of the person of the person ID "15d" and the entry time of the person of the person ID "1a".

In this way, when authentication scores of the registration image with respect to the first person and the second person are compared with each other, if the authentication score of the registration image with respect to the second person is higher, the derivation unit 311 can derive a staying time with use of the registration image with respect to the second person.

Moreover, in a use case according to the first exemplary embodiment, it is conceivable that a person who has once entered the predetermined region 200 exits the predetermined region 200 and, after that, enters the predetermined region 200 again. At this time, if the entry time at which the person has entered the predetermined region 200 in the entering direction 230 is used to derive a staying time in a case where the person has entered for the second time, an incorrect staying time may be derived.

Therefore, the storage unit 301 excludes, from registration information stored therein, a registration image determined to be the same person as a person who passes through the gate 210 or 211 in the exiting direction 231 from the predetermined region 200 by the matching unit 310. This enables preventing deriving an incorrect staying time with respect to a person who has entered the predetermined region 200 again.

Furthermore, one or more functions of the information processing apparatus 100 in the first exemplary embodiment can be included in another apparatus, such as an imaging apparatus or a recording apparatus. For example, the detection unit 305 of the information processing apparatus 100 can be included in an imaging apparatus.

As described above, performing the flowcharts illustrated in FIGS. 4A and 4B enables the information processing apparatus 100 to derive a time during which a person who has entered the predetermined region 200 stays in the predetermined region 200.

In a conventional technique, in deriving a staying time of a person in a predetermined region, images captured when the person passes through gates used for entering and exiting the predetermined region may be unsuitable for performing matching with respect to the person, so that the accuracy of deriving a staying time of a person in a predetermined region may become lower in some cases.

Therefore, the information processing apparatus 100 in the first exemplary embodiment associates entry time at which a person has passed through a gate in the entering direction 230 with a registration image adapted for matching processing with use of tracking. The information processing apparatus 100 further associates exit time at which a person has passed through a gate in the exiting direction 231 with a person determined to be the same person as the person of the registration image by matching with use of tracking.

Then, the information processing apparatus 100 derives, from the entry time and the exit time associated with a person, a staying time of the person in a predetermined region. This enables increasing the accuracy of deriving a staying time of a person in a predetermined region.

While, in the first exemplary embodiment, a configuration in which two imaging apparatuses are installed with respect to each of the gate 210 and the gate 211 of the predetermined region 200 has been described, the first exemplary embodiment is not limited to this. In a second exemplary embodiment, a configuration in which a plurality of imaging apparatuses is used to perform image capturing of a person who passes through a gate in the entering direction (or in the exiting direction) is described.

Moreover, while, in the first exemplary embodiment, a configuration which derives a staying time of a person in one predetermined region has been described, the first exemplary embodiment is not limited to this. Therefore, in the second exemplary embodiment, a configuration which derives a staying time of a person in each of a plurality of predetermined regions is described.

Figure 10:
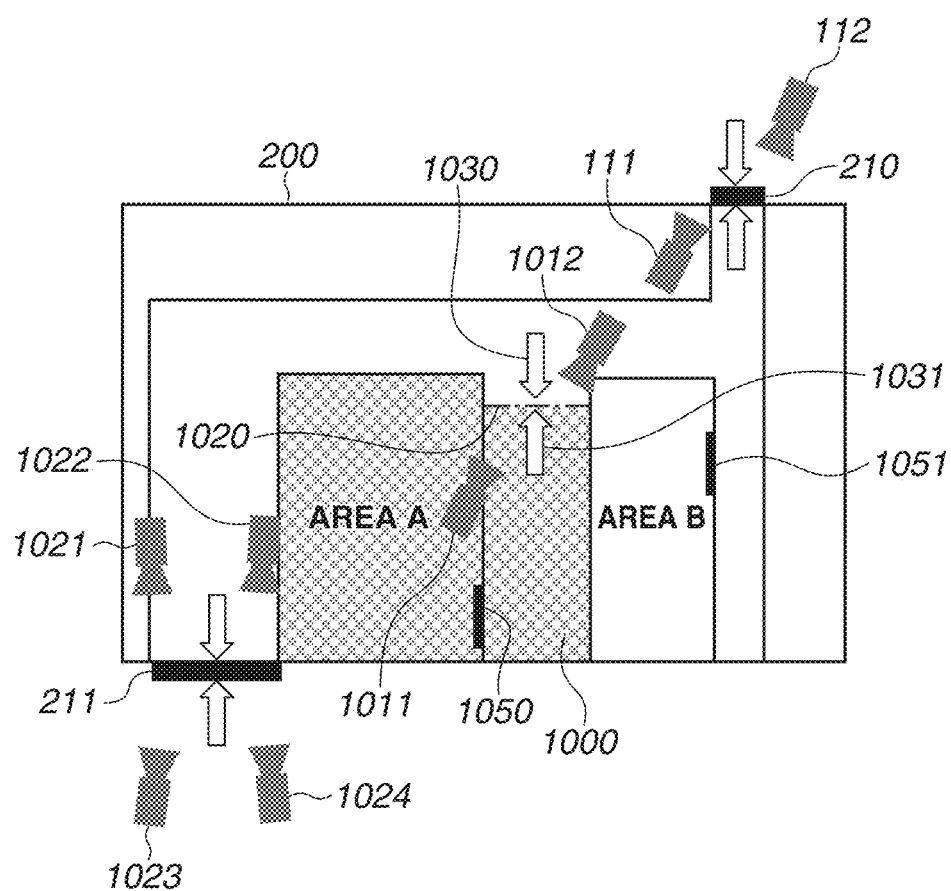
FIG. 10 is a diagram used to explain information processing for deriving a staying time.

FIG. 10 is a schematic diagram used to explain information processing which is performed by the information processing apparatus 100 in the second exemplary embodiment. As illustrated in FIG. 10, imaging apparatuses 1021 ad 1022 are installed in such a way as to perform image capturing of a person who passes through the gate 211 of the predetermined region 200 in the entering direction 230. Furthermore, it is desirable that the image capturing range of the imaging apparatus 1021 and the image capturing range of the imaging apparatus 1022 do not overlap each other. The second exemplary embodiment is described assuming that the respective image capturing ranges of the imaging apparatuses 1021 ad 1022 do not overlap each other.

Moreover, imaging apparatuses 1023 ad 1024 are installed in such a way as to perform image capturing of a person who passes through the gate 211 of the predetermined region 200 in the exiting direction 231. Furthermore, it is desirable that the image capturing range of the imaging apparatus 1023 and the image capturing range of the imaging apparatus 1024 do not overlap each other. The second exemplary embodiment is described assuming that the respective image capturing ranges of the imaging apparatuses 1023 ad 1024 do not overlap each other.

Moreover, as illustrated in FIG. 10, an imaging apparatus 1011 is installed in such a way as to perform image capturing of a person who passes through a virtual gate 1020, which is an imaginary gate used for entering or exiting a predetermined region 1000, in an entering direction 1030. On the other hand, an imaging apparatus 1012 is installed in such a way as to perform image capturing of a person who passes through the virtual gate 1020, which is used for the predetermined region 1000, in an exiting direction 1031. Furthermore, in FIG. 10, the predetermined region 1000 is a region indicated by a checkerboard pattern in the predetermined region 200, and includes the region of an area A.

Furthermore, the virtual gate 1020 is set by an image captured by the imaging apparatus 1011 or 1012 being displayed on the display 130 by the display control unit 302 of the information processing apparatus 100 and the user designating a passing line with respect to the displayed image. Furthermore, in FIG. 10, a person is allowed to move to the area A or an area B via a door 1050 or a door 1051, respectively.

Figure 7B:
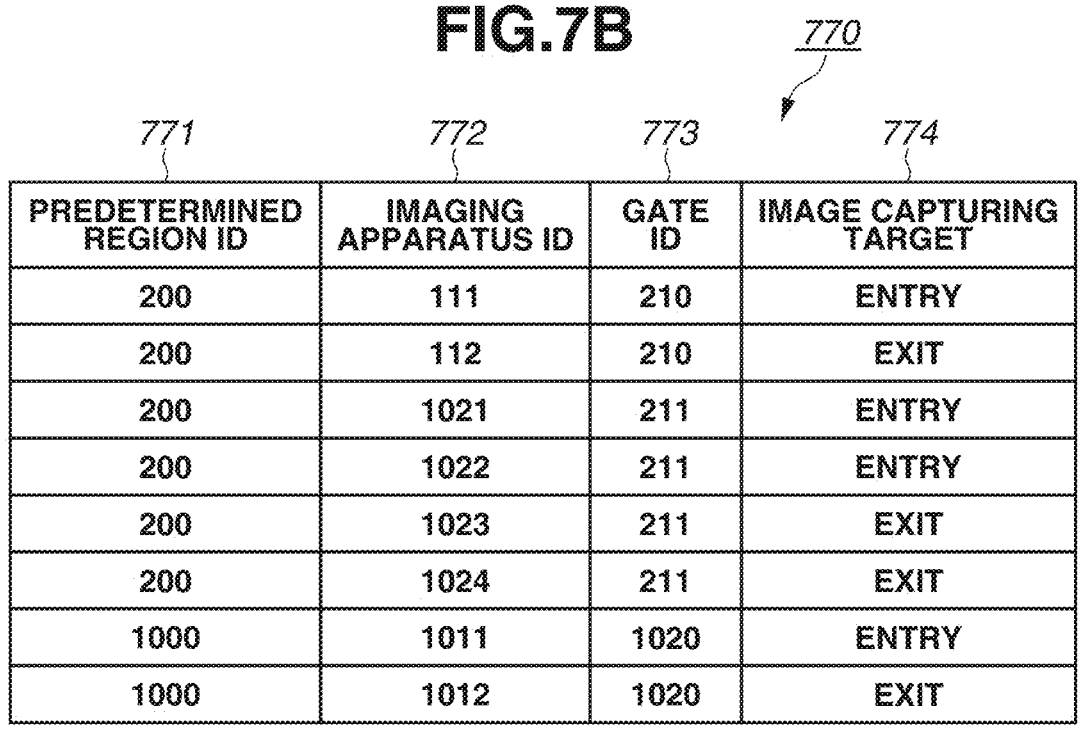

The storage unit 301 stores an installation table, which is a table about installation conditions of the respective imaging apparatuses. A table 770 illustrated in FIG. 7B is an example of an installation table in the second exemplary embodiment, as with the table 700. The table 770 includes a predetermined region ID 771, which is information for identifying each predetermined region, an imaging apparatus ID 772, which is information for identifying each imaging apparatus, a gate ID 773, which is information for identifying each gate corresponding to a predetermined region, and an image capturing target 774, which is information indicating a target for image capturing performed by each imaging apparatus.

For example, the table 770 indicates that the imaging apparatus 1011 is installed in such a way as to perform image capturing of a person who passes through the 1020 of the predetermined region 1000 in the entering direction 1030.

The information processing apparatus 100 in the second exemplary embodiment derives a staying time during which a person has stayed in the predetermined region 200, and also derives a staying time during which a person has stayed in the predetermined region 1000.

In the second exemplary embodiment, the processing illustrated in FIGS. 4A and 4B is performed for each of the predetermined region 200 and the predetermined region 1000.

In a case where the processing is performed for the predetermined region 200, the processing illustrated in FIG. 4A is performed with respect to images captured by the imaging apparatuses 111, 1021, and 1022 based on the table 770. Moreover, in a case where the processing is performed for the predetermined region 200, the processing illustrated in FIG. 4B is performed with respect to images captured by the imaging apparatuses 112, 1023, and 1024 based on the table 770.

This enables deriving a staying time of a person in the predetermined region 200.

On the other hand, in a case where the processing is performed for the predetermined region 1000, the processing illustrated in FIG. 4A is performed with respect to an image captured by the imaging apparatus 1011 based on the table 770. Moreover, in a case where the processing is performed for the predetermined region 1000, the processing illustrated in FIG. 4B is performed with respect to an image captured by the imaging apparatus 1012 based on the table 770.

This enables deriving a staying time of a person in the predetermined region 1000.

Furthermore, one or more functions of the information processing apparatus 100 in the second exemplary embodiment can be included in another apparatus, such as an imaging apparatus or a recording apparatus. For example, the detection unit 305 of the information processing apparatus 100 can be included in an imaging apparatus.

As described above, even in a case where a plurality of imaging apparatuses is used to perform image capturing of a person who passes through a gate in the entering direction (or in the exiting direction) or even in a case where there is a plurality of predetermined regions which are regions from which to derive a staying time, it is possible to derive a staying time of a person in a predetermined region.

Next, a hardware configuration of the information processing apparatus 100 for implementing the functions of each exemplary embodiment is described with reference to FIG. 11. Furthermore, while, in the subsequent description, the hardware configuration of the information processing apparatus 100 is described, each of the recording apparatus 120 and the imaging apparatuses 111 to 114 is implemented with a similar hardware configuration.

The information processing apparatus 100 in each exemplary embodiment includes a central processing unit (CPU) 1100, a random access memory (RAM) 1110, a read-only memory (ROM) 1120, a hard disk drive (HDD) 1130, and an interface (I/F) 1140.

The CPU 1100 comprehensively controls the information processing apparatus 100.

The RAM 1110 temporarily stores a computer program which the CPU 1100 executes. Moreover, the RAM 1110 provides a work area which the CPU 1100 uses to perform processing. Moreover, for example, the RAM 1110 functions as a frame memory or functions as a buffer memory.

The ROM 1120 stores, for example, a program used for the CPU 1100 to control the information processing apparatus 100. The HDD 1130 is a recording device which records, for example, image data.

The I/F 1140 performs communication with an external apparatus via the network 140 in conformity with, for example, Transmission Control Protocol/Internet Protocol (TCP/IP) or HyperText Transfer Protocol (HTTP).

Furthermore, while, in the above-described exemplary embodiments, a case where the CPU 1100 performs processing has been described, at least a part of processing operations which the CPU 1100 performs can be configured to be performed by dedicated hardware. For example, processing for causing the display 130 to display a graphical user interface (GUI) or image data can be performed by a graphics processing unit (GPU). Moreover, processing for reading out program code from the ROM 1120 and loading the program code onto the RAM 1110 can be performed by direct memory access (DMA), which functions as a transfer device.

Furthermore, the disclosure can be implemented by processing for causing one or more processors to read out and execute a program for implementing one or more functions of each of the above-described exemplary embodiments. The program can be configured to be supplied to a system or apparatus including a processor via a network or a storage medium. Moreover, the disclosure can also be implemented by a circuit which implements one or more functions of each of the above-described exemplary embodiments (for example, an application specific integrated circuit (ASIC)). Moreover, each unit of the information processing apparatus 100 can be implemented by hardware illustrated in FIG. 11 or can be implemented by software.

While, the disclosure has been described above based on exemplary embodiment thereof, the above-described exemplary embodiments are merely examples of specific configurations for implementing the disclosure, and should not be construed to limit the technical scope of the disclosure. In other words, the disclosure can be implemented in various manners without departing from the technical idea of the disclosure or main characteristics thereof. For example, a combination of the above-described exemplary embodiments is included in the disclosure of the present specification.

According to the above-described exemplary embodiments, it is possible to increase the accuracy of deriving, from captured images, a staying time of a person in a predetermined region.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-197020 filed Oct. 18, 2018, which is hereby incorporated by reference herein in its entirety.

What is claimed is:

1. An information processing apparatus comprising a computer executing instructions that, when executed by the computer, cause the computer to:
   detect a person from an image containing a gate through which a person enters or exits a predetermined region;
   perform a tracking process for tracking the person;
   determine whether a person who has been tracked by the tracking process has passed through the gate in a first direction which is a direction from outside to inside the predetermined region, to obtain a first clock time when the person has passed through the gate in the first direction;
   extract, from a plurality of images each containing the person who has been tracked by the tracking process starting with a state of being situated outside the predetermined region, an image satisfying a predetermined condition as a registration image of the person;
   store the registration image of the person so as to associate the registration image of the person with the first clock time of the person by use of the tracking process, even if a timing when the registration image of the person was captured is different from the first clock time of the person;
   determine whether a given person who has been tracked by the tracking process has passed through the gate in a second direction which is a direction from inside to outside the predetermined region, to obtain a second clock time when the given person has passed through the gate in the second direction;
   perform matching process, by using the registration image of the person and at least one image of a plurality of captured images each containing the given person who has been tracked by the tracking process starting with a state of being situated inside the predetermined region, to determine whether the person of the registration image and the given person are identical; and
   derive, in a case where the person of the registration image and the given person are determined to be identical, a staying time which is a time during which the person has stayed in the predetermined region, based on the first clock time and the second clock time.

2. The information processing apparatus according to claim 1, wherein the image satisfying the predetermined condition is, from among the plurality of images each containing a person who has been tracked by the tracking process, an image whose face likelihood, which is information indicating a degree of image capturing of a face of the person, is greater than or equal to a first threshold value.

3. The information processing apparatus according to claim 1, wherein the image satisfying the predetermined condition is, from among the plurality of images each containing a person who has been tracked by the tracking process, an image whose face likelihood, which is information indicating a degree of image capturing of a face of the person, is greater than or equal to a first threshold value and is the highest.

4. The information processing apparatus according to claim 1, wherein the matching process is performed, based on a feature quantity of the given person from at least one image of the plurality of captured images each containing the given person, and a feature quantity of a person corresponding to the registration image, to determine whether the person of the registration image and the given person are identical.

5. The information processing apparatus according to claim 4, wherein, in a case where an authentication score indicating a degree of coincidence of persons calculated by comparing a feature quantity of the given person from at least one image of the plurality of captured images each containing the given person with a feature quantity of the person corresponding to the registration image is greater than a second threshold value, it is determined that the given person and the person of the registration image are identical.

6. The information processing apparatus according to claim 5, wherein, in a case where the given person who is tracked by the tracking process starting with a state of being situated inside the predetermined region has passed through a predetermined position, a threshold value used for comparison with the authentication score is changed to a third threshold value smaller than the second threshold value, and, in a case where the authentication score is greater than the third threshold value, it is determined that the given person and the person of the registration image are identical.

7. The information processing apparatus according to claim 4,
   wherein the instruction further causes the computer to extract an image satisfying a predetermined condition from the plurality of images each containing the given person who has been tracked by the tracking process starting with a state of being situated inside the predetermined region, and
   wherein the matching process is performed, based on a feature quantity of the given person from the extracted image and a feature quantity of the person of the registration image, to determine whether the given person and the person of the registration image are identical.

8. An information processing method comprising:
   detecting a person from an image containing a gate through which a person enters or exits a predetermined region;
   performing a tracking process for tracking the person;
   determining whether a person who has been tracked by the tracking process has passed through the gate in a first direction, which is a direction from outside to inside the predetermined region, to obtain a first clock time when the person has passed through the gate in the first direction;
   extracting, from a plurality of images each containing the person who has been tracked by the tracking process starting with a state of being situated outside the predetermined region, an image satisfying a predetermined condition as a registration image of the person;
   storing the registration image of the person so as to associate the registration image of the person with the first clock time of the person by use of the tracking process, even if a timing when the registration image of the person was captured is different from the first clock time of the person;
   determining whether a given person who has been tracked by the tracking process has passed through the gate in a second direction which is a direction from inside to outside the predetermined region, to obtain a second clock time when the given person has passed through the gate in the second direction;
   performing matching process, by using the registration image of the person and at least one image of a plurality of captured images each containing the given person who has been tracked by the tracking process starting with a state of being situated inside the predetermined region, to determine whether the person of the registration image and the given person are identical;

and deriving, in a case where the person of the registration image and the given person are determined to be identical, a staying time which is a time during which the person has stayed in the predetermined region, based on the first clock time and the second clock time.

9. A non-transitory computer-readable storage medium storing computer-executable instructions that, when executed by a computer, cause the computer to perform a method, the method comprising:

detecting a person from an image containing a gate through which a person enters or exits a predetermined region;

performing a tracking process for tracking the person who is detected;

determining whether a person who has been tracked by the tracking process has passed through the gate in a first direction, which is a direction from outside to inside the predetermined region, to obtain a first clock time when the person has passed through the gate in the first direction;

extracting, from a plurality of images each containing the person who has been tracked by the tracking process starting with a state of being situated outside the predetermined region, an image satisfying a predetermined condition as a registration image of the person;

storing the registration image of the person so as to associate the registration image of the person with the first clock time of the person by use of the tracking process, even if a timing when the registration image of the person was captured is different from the first clock time of the person;

determining whether a given person who has been tracked by the tracking process has passed through the gate in a second direction which is a direction from inside to outside the predetermined region, to obtain a second clock time when the given person has passed through the gate in the second direction;

performing matching process, by using the registration image of the person and at least one image of a plurality of captured images each containing the given person who has been tracked by the tracking process starting with a state of being situated inside the predetermined region, to determine whether the person of the registration image and the given person are identical;

and deriving, in a case where the person of the registration image and the given person are determined to be identical, a staying time which is a time during which the person has stayed in the predetermined region, based on the first clock time and the second clock time.

* * * * *